United States Patent Office 3,141,898
Patented July 21, 1964

3,141,898
2,2-DIMETHYL-2-SILAALKANE-SULFONIC
ACIDS AND THEIR SALTS
George Van Dyke Tiers, St. Paul, Minn., assignor to
Minnesota Mining and Manufacturing Company, St.
Paul, Minn., a corporation of Delaware
No Drawing. Filed Jan. 3, 1961, Ser. No. 79,962
6 Claims. (Cl. 260—448.2)

This invention relates to silicon-containing organic compounds and more particularly to certain sulfonic acid-substituted sila-alkanes and their salts.

It is an object of the invention to provide certain new compounds which are substituted silanes and which contain the sulfonyl group. Another object of the invention is to provide water-soluble compounds which are useful as internal reference standards for nuclear spin resonance (also entitled "nuclear magnetic resonance") spectroscopy. Other objects will be apparent from the disclosures made hereinbelow.

In accordance with the above and other objects of the invention there has been produced a new and useful class of silanes. The compounds of the invention can be represented by the formula:

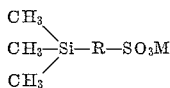

wherein each R is a divalent linking alkylene radical having from 1 to 12 carbon atoms, and M represents hydrogen when the compounds are sulfonic acids, and M represents a salt-forming cation such as ammonium and metallic ions when the compound is a salt.

"Ammonium" refers to unsubstituted and substituted ammonium ions, including quaternary ammonium ions, while the metals useful in salt formation include all metals which form salts with sulfonic acids, for example, zinc, aluminum, tin, iron, copper, and the alkali and alkaline earth metals, such as sodium, potassium, calcium, magnesium and the like.

In acid form, the compounds are soluble in the common polar organic solvents and are soluble in water, these being highly ionized and forming strongly acidic solutions. The salts are white solids which decompose on strong heating, and are soluble in water to an appreciable extent, somewhat soluble in the lower alkanols and generally insoluble in most non-polar organic solvents. All of the salts show strong characteristic infrared absorption bands at 8.41 and 9.50μ.

Compounds of the invention in which R is greater than 1 are prepared in aqueous media by the addition of a metallic bisulfite to an unsaturated silane represented by the formula:

$$(CH_3)_3—Si—R'$$

wherein R' is a terminally unsaturated alkylene radical having from 2 to 12 carbon atoms. A free radical initiator is used, such as oxygen (which may be supplied by using air), potassium persulfate, or the nitrate-nitrite system described by Kharasch et al. in J. Organic Chem., v. 3, p. 175. An amount of water-soluble co-solvent such as methanol may be added to the medium in accordance with the procedure described by Harmen in U.S. Patent 2,504,411. The substituted sila-alkane sulfonate salt thus formed can be recovered from the reaction mixture and purified by means of known techniques such as evaporation of the reaction mixture to dryness, extraction of the residue with hot alcohol, and cooling the filtered solution to precipitate the desired product in crystalline form.

For the preparation of the compounds of the invention having the formula:

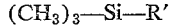

(wherein M has the significance noted above) the procedure used is in some respects similar to that used for the compounds of longer chain length in the alkylene linking radical, except that a starting compound of the formula:

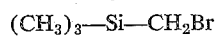

is used, higher reaction temperatures are helpful, and free radical initiators may be omitted.

The free sulfonic acids can be prepared from their salts by passing an aqueous solution of the salt through a column of cation exchange resin which is in the acid state (hydrogen form) and evaporating the effluent to dryness to recover the solid sulfonic acid as its hydrate. The compounds of the invention are hydrated when prepared in the presence of water and the acids tend to be more stable when hydrated. Accordingly, the compounds of the invention may contain an integral number of moles of water of hydration, e.g., one, two, or three or more. The water of hydration can be removed by the usual methods.

The compounds of the invention, whether in the form of the free sulfonic acids or their salts, have surface tension-lowering properties and are therefore useful as wetting agents, particularly where R is a relatively long carbon chain. The member of the group in which R is trimethylene is especially useful as an internal reference standard for nuclear spin resonance spectroscopy in aqueous and ionic solutions. An important reason for this is that in solutions useful for such spectroscopy it provides a single, sharply defined resonance peak at 10.00τ (tau), while the other resonances which are attributable to this preferred compound are so small and widely distributed that they are virtually indistinguishable from the background "noise" effects. Tetramethyl silane, the widely accepted standard internal reference for non-aqueous organic solvent systems, has its sharp peak at exactly the same point; (the use of tetramethylsilane for this purpose is discussed in L. M. Jackman, "Applications of Nuclear Magnetic Resonance Spectroscopy in Organic Chemistry," Pergamon Press, New York, 1959). However, tetramethyl silane is not soluble in aqueous media and cannot be employed as a standard in these media. The preferred compound of the invention accordingly provides an internal reference standard which permits the comparable measurement of the nuclear spin resonance spectra of a wide variety of compounds in aqueous systems. This was not heretofore possible using the known standard.

The following examples will more specifically illustrate the preparation of the compounds of the invention. In the examples, all parts are by weight unless otherwise specified.

*Example 1*

A mixture of 50 grams (0.48 mole) of sodium bisulfite, 5 grams (0.072 mole) of sodium nitrite, 5 grams (0.059 mole) of sodium nitrate, 150 ml. of distilled water, 250 ml. of methanol and 25 grams (0.22 mole) of allyl trimethyl silane was placed in a tightly stoppered flask and stirred for about 4 days with a magnetic stirring device. A fluffy white precipitate was formed. The mixture was then evaporated to dryness on a steam bath and the residue was extracted for about sixteen hours with absolute ethanol in a Soxhlet apparatus. The hot solution was filtered through fine filter paper to remove traces of inorganic salts, and upon cooling a white crystalline precipitate formed, which was recovered by filtration. The precipitate was washed with cold absolute ethanol; after subsequent recrystallization from ethanol, substantially pure sodium 2,2-dimethyl-2-sila-pentane-5-sulfonate monohydrate was obtained.

*Analysis.*—Calculated for: $C_6H_{14}NaO_3SiS \cdot H_2O$: C, 30.5%; H, 7.2%; $H_2O$, 7.7%. Found: C, 30.5%; H, 7.2%; $H_2O$, 7.3%.

(Anhydrous sodium 2,2-dimethyl-2-silapentane-5-sulfonate is obtained by drying the monohydrate for about 4 hours in vacuo at 130° C.) In a mineral oil mull, the monohydrate showed characteristic bands in its infrared spectrogram at 8.01, 8.41, 9.50, 11.65, 12.05, 13.24, 13.47 and 14.34 microns.

The same product is obtained when only distilled water is employed as the solvent and methanol is omitted.

When a solution of 2.4 g. of sodium 2,2-dimethyl-2-silapentane-5-sulfonate monohydrate in 100 ml. of water is passed through a column containing about 50 g. of a strongly acidic cation exchange resin in granular form (available commercially under the trademark name Amberlite IR-12) in the hydrogen (acid) form, the effluent contains 2,2-dimethyl-2-silapentane sulfonic acid, which can be recovered as a white amorphous-appearing solid by evaporating the solution to dryness in vacuo. By adding an aqueous or ethanolic solution of the free acid to a stoichiometrically equivalent amount of a metallic or ammonium base in dilute aqueous solution and evaporating to dryness in vacuo, the corresponding metal salt is prepared.

In this way, by use of solutions of potassium bicarbonate, calcium hydroxide, trimethyl amine, ammonium hydroxide, or tetramethyl ammonium hydroxide, there are formed the corresponding potassium, calcium, trimethylammonium, ammonium or tetramethyl ammonium salts of 2,2 - dimethyl-2-silapentane-2-sulfonate. The tetramethylammonium salt is relatively more soluble than the sodium salt in certain polar organic solvents (such as acetone) and may be preferred for certain types of nuclear spin resonance spectroscopic studies.

*Example 2*

Following the procedure of Example 1, 20 g. of vinyl trimethylsilane and 20.8 grams of sodium bisulfite are reacted by shaking for 2 days in 100 ml. of distilled water containing 2.4 g. each of sodium nitrite and sodium nitrate. The sodium 2,2-dimethyl-2-sila-butane-4-sulfonate monohydrate thus prepared is a white crystalline solid, which exhibits strong sulfonate absorption bands (in a mineral oil mull) at 8.40 and 9.50μ when subjected to infrared spectroscopic analysis. Substantially the same results are obtained when tertiary butyl hydroperoxide is employed as the catalyst instead of the mixed nitrate-nitrite catalyst.

When equivalent amounts of $\Delta^{5,6}$ hexenyl-trimethyl silane or $\Delta^{10,11}$ hendecenyl-trimethyl silane are used in the procedure of Example 1 in place of allyl trimethyl silane, there are produced, respectively, the hydrated sodium salts of 2,2-dimethyl-2-silaoctane-8-sulfonic acid and 2,2-dimethyl-2-silatridecane-4-sulfonic acid. Anhydrous salts are obtained by drying in vacuo.

What is claimed is:

1. A compound of the group consisting of sulfonic acids represented by the formula

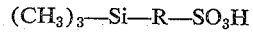

wherein R is a divalent linking alkylene radical having from 1 to 12 carbon atoms, ammonium and metal salts of said acids, and hydrates of said acids and salts.

2. Sodium 2,2-dimethyl-2-silapentane-5-sulfonate having the formula:

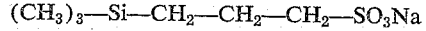

3. Sodium 2,2-dimethyl-2-silapentane-5-sulfonate monohydrate.

4. Sodium 2,2-dimethyl-2-silabutane-4-sulfonate having the formula:

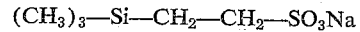

5. 2,2-dimethyl-2-silapentane-5-sulfonic acid.
6. 2,2-dimethyl-2-silabutane-4-sulfonic acid.

References Cited in the file of this patent
UNITED STATES PATENTS

| 2,789,121 | Cooper | Apr. 16, 1957 |
| 2,955,128 | Bailey | Oct. 4, 1960 |

OTHER REFERENCES

Bygden: "Journal Praktische Chemie," volume 96 (1917), pages 86–104.

Tiers et al.: "American Chem. Society, Abstract of Papers, 137th Meeting," April 1960, page 17R.

Tiers et al.: "Journal Organic Chem.," volume 26 (June 1961), pages 2097–8.